United States Patent
Russ et al.

(10) Patent No.: US 7,545,378 B2
(45) Date of Patent: Jun. 9, 2009

(54) FOOT ROLL RIGGING

(75) Inventors: Robert H Russ, Oakland, CA (US); Christian D Hoffman, Oakland, CA (US); David H Mullins, Kensington, CA (US); Steven Clay Hunter, San Francisco, CA (US)

(73) Assignee: Pixar, Emeryville, CA (US)

( * ) Notice: Subject to any disclaimer, the term of this patent is extended or adjusted under 35 U.S.C. 154(b) by 0 days.

(21) Appl. No.: 11/130,730

(22) Filed: May 16, 2005

(65) Prior Publication Data

US 2005/0253852 A1 Nov. 17, 2005

Related U.S. Application Data

(60) Provisional application No. 60/572,008, filed on May 17, 2004.

(51) Int. Cl.
*G06T 15/70* (2006.01)
(52) U.S. Cl. ..................................... 345/473
(58) Field of Classification Search ................ 345/952, 345/953, 959
See application file for complete search history.

(56) References Cited

U.S. PATENT DOCUMENTS

| 7,012,608 | B1 * | 3/2006 | Fujisaki | 345/474 |
| 7,088,366 | B2 * | 8/2006 | Okubo | 345/473 |
| 2003/0022715 | A1 | 1/2003 | Okubo | |

OTHER PUBLICATIONS

Armin Bruderlin , Thomas W. Calvert, "Goal-Directed, Dynamic Animation of Human Walking," Jul. 1989, Computer Graphics, vol. 23, No. 3, p. 233-242.*

Jessica K. Hodgins, Wayne L. Wooten, David C. Brogan, James F. O'Brien, "Animating Human Athletics," Sep. 1995, Proceedings of the 22nd Annual Conference on Computer Graphics and Interactive Techniques, p. 71-78.*

Chris Maraffi, "Book: Maya® Character Creation: Modeling and Animation Controls," Sep. 11, 2003, ISBN: 978-0-7357-1344-4, Chapter 3, Proquest Safari Books [online] <http://proquest.safaribooksonline.com/0735713448 >.*

Taku Komura, Atsushi Kuroda, Shunsuke Kudoh, Tai Chiew Lan, Yoshinhis Shinagawa, "An Inverse Kinematics Method for 3D Figures with Motion Data," Jul. 9, 2003, Proceedings of the Computer Graphics International, p. 266-2.*

* cited by examiner

*Primary Examiner*—Ulka Chauhan
*Assistant Examiner*—Jason M Repko
(74) *Attorney, Agent, or Firm*—Law Office of Jonathan Hollander PC

(57) ABSTRACT

A system and method enables animators to pose character models' feet. An initial foot model position is received. The initial foot model position specifies a foot model contact point. One or more foot roll parameters are specified that change the relative angle between at least a portion of the foot model and an initial orientation of an alignment plane. Foot roll parameters specify the rotation of the foot model around foot model contact points. Foot roll parameters can include heel roll, ball roll, and toe roll, which specify the rotation of the foot model around contact points on the heel, ball, and toe, respectively, of a foot model. To maintain the position of the foot model contact point, the foot model position is adjusted based on the foot roll parameter. The repositioned foot model is realigned with alignment plane, which restores contact at the foot model contact point.

20 Claims, 10 Drawing Sheets

FOOT ROLL RIGGING

CROSS-REFERENCES TO RELATED APPLICATIONS

This application claims priority to U.S. Provisional Patent Application No. 60/572,008, filed May 17, 2004, which is incorporated by reference herein for all purposes.

BACKGROUND OF THE INVENTION

The present invention relates to the field of computer graphics, and in particular to methods and apparatus for animating computer generated characters. Many computer graphic images are created by mathematically modeling the interaction of light with a three dimensional scene from a given viewpoint. This process, called rendering, generates a two-dimensional image of the scene from the given viewpoint, and is analogous to taking a photograph of a real-world scene. Animated sequences can be created by rendering a sequence of images of a scene as the scene is gradually changed over time. A great deal of effort has been devoted to making realistic looking rendered images and animations.

Animation, whether hand-drawn or computer generated, is as much an art as it is a science. Animators must not only make a scene look realistic, but must also convey the appropriate dramatic progression and emotional impact required by the story. This is especially true when animating characters. Characters drive the dramatic progression of the story and establish an emotional connection with the audience.

Effective walk animations are often an important contribution to the expressiveness of a character's animation. A character's walk or gait can be used to express the character's emotions. Additionally, walking, running, or other types of character motion can add excitement to a scene, as compared with scenes having motionless characters. At the very least, effective and realistic walk animations reinforce an audience's suspension of disbelief. However, creating convincing walk animations with the appropriate emotional expression and level of energy is particularly challenging and time consuming.

One of the difficulties in creating walk animations arises from the kinematic complexity of walking itself. During a typical walk animation for a bipedal character model, the foot first touches the ground at the heel. As the character's weight shifts forward, the foot rotates around the heel contact point until it is flat against the ground surface. Then, as the character's weight shifts further forward, the foot begins to lift off the ground, typically by bending and rotating around the ball of the foot. Finally, the foot lifts off the ground entirely and the character's weight is transferred to the other foot.

Many animation tools make it difficult to mimic these kinematic attributes of walking. Typically, animation tools enable animators only to rotate the foot around specifically defined locations, such as the ankle or ball of the foot. As animators apply rotations to these locations, the foot of a character model often slides forward or backwards relative to the ground plane. Additionally, these rotations can also cause the foot to lift off the ground plane prematurely, or to penetrate below the ground plane.

As a result of these effects, the correct positioning of the foot of a character model during a walk animation is often an iterative process. First, the animator places the foot at the desired location relative to the ground plane. The animator then specifies the desired foot rotation around the heel and/or ball. This causes the contact point of the foot to shift position relative to the ground; thus the animator must then reposition the foot back to the desired location. As adjustments are made to the foot rotation, the animator must make further adjustments to the position of the foot. Because of the complexity and time required for these iterative adjustments, animators tend to construct scenes in which character models' feet are hidden, so as to avoid this issue entirely.

It is therefore desirable for a system and method to enable animators to efficiently specify the positions and rotations of the feet of character models. It is further desirable that the system and method automatically adjust the position of the foot of a character model in response to a rotation to eliminate unwanted shifts in position of the foot contact point. It is also desirable that the system and method be suitable for rotations of the foot of a character model around the heel contact point, the ball contact, and any other foot contact point.

BRIEF SUMMARY OF THE INVENTION

An embodiment of the invention includes a system and method that enables animators to efficiently specify the positions and rotations of the feet of character models. In an embodiment, an animator specifies an initial foot model position. The initial foot model position specifies a foot model contact point. Animators specify one or more foot roll parameters that change the relative angle between at least a portion of the foot model and an initial orientation of an alignment plane. Foot roll parameters specify the rotation of the foot model around foot model contact points. Foot roll parameters can include heel roll, ball roll, and toe roll, which specify the rotation of the foot model around contact points on the heel, ball, and toe, respectively, of a foot model. To maintain the position of the foot model contact point, the foot model position is adjusted based on the foot roll parameter. The repositioned foot model is realigned with alignment plane, which restores contact at the foot model contact point.

In an embodiment, a method of posing a foot model includes receiving a first orientation of an alignment plane; receiving a foot position specifying the position of the foot model; and receiving a foot roll parameter for the foot model. The foot roll parameter specifies an angle between an alignment plane and a reference frame associated with the foot model. The method further includes changing the relative angle between at least a portion of the foot model and the alignment plane based on the foot roll parameter; specifying a new foot position for the foot model based on the foot roll parameter; and realigning the foot model with the alignment plane.

In a further embodiment, changing the relative angle between at least a portion of the foot model and the alignment plane includes applying a transformation to the alignment plane. The transformation includes a rotation proportional to the foot roll parameter, which rotates the alignment plane to a second orientation. Specifying a new foot position includes applying the transformation to the foot position. In an additional embodiment, realigning the foot model with the alignment plane includes rotating the foot model such that the reference frame associated with the foot model is aligned with the second orientation of the alignment plane.

In another embodiment, changing the relative angle between at least a portion of the foot model and the alignment plane includes applying a transformation to the reference frame associated with the foot model. The transformation includes a rotation proportional to the foot roll parameter, which rotates the reference frame associated with the foot model around a first joint. Specifying a new foot position includes applying an inverse of the transformation to the foot position. In an additional embodiment, changing the relative angle between at least a portion of the foot model and the alignment plane also includes applying a transformation to a predetermined portion of the foot model, thereby rotating the predetermined portion of the foot model around the first joint. In still another embodiment, realigning the foot model with the alignment plane includes rotating the foot model such that the reference frame associated with the foot model is aligned with the first orientation of the alignment plane.

BRIEF DESCRIPTION OF THE DRAWINGS

The invention will be described with reference to the drawings, in which.

In the drawings, the use of like reference numbers indicates similar elements.

DETAILED DESCRIPTION OF THE INVENTION

Figure 1A:
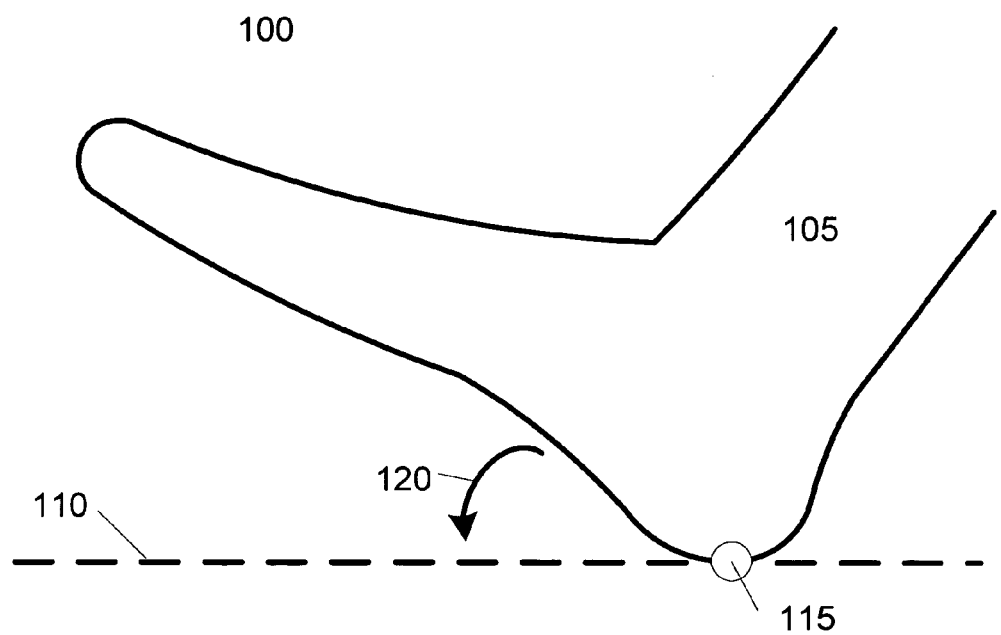
FIGS. 1A-1B illustrate two different phases of a walk animation suitable for an application of an embodiment of the invention.
Figure 1B:
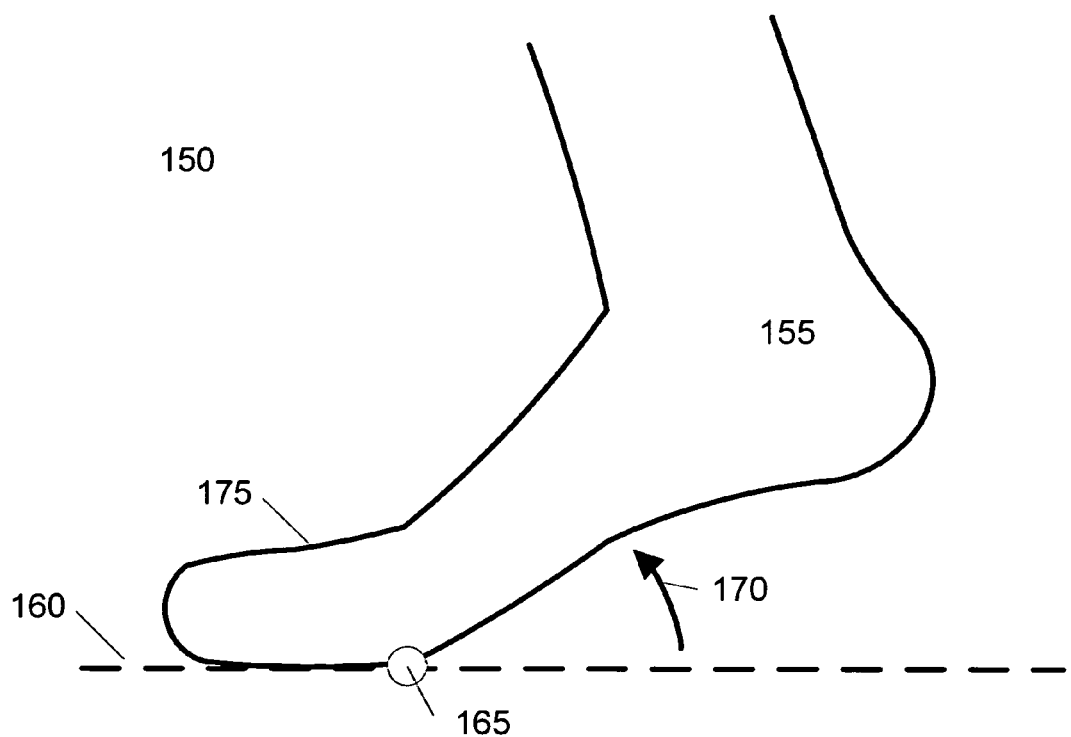

FIGS. 1A-1B illustrate two different phases of a walk animation suitable for an application of an embodiment of the invention. FIG. 1A illustrates a first phase 100 of a typical walk animation. In phase 100, the foot 105 of a character model contacts the ground plane 110 at heel contact point 115. As the character model moves forward, the foot 105 rotates around the heel contact point 115 until it is flat against the ground surface. The rotation 120 of the foot 105 around heel contact point 115 is referred to as heel roll.

FIG. 1B illustrates a second phase 150 of a typical walk animation. In phase 150, the foot 155 of a character model is lifted from the ground plane 160. In phase 150, the foot 155 rotates around ball contact point 165. Additionally, the toe portion 175 of the foot 155 bends so as to remain in contact with the ground plane 160. The rotation 170 of foot 155 around ball contact point 165 is referred to as ball roll.

Phases 100 and 150 are provided for the purposes of illustration, and embodiments of the invention can be applied to any type of animation in which a foot or other portion of a character model is positioned with respect to and/or rotated around a contact point. Additionally, the heel roll and ball roll rotations can be employed in any phase of a walk animation. For example, a tip-toeing walk animation may use ball roll rotation as the foot of character model makes initial contact with a surface.

Additionally, computer-generated animation of characters is typically accomplished by manipulating a three-dimensional model of a character into a series of bodily positions, or poses, over a sequence of frames. A realistic looking character model is often extremely complex, having millions of surfaces and hundreds or thousands of attributes. Due to the complexity involved with animating such complex models, animation tools often rely on armatures and animation variables to define character animation.

An armature is a "stick figure" representing the character's pose, or bodily position. By moving the armature segments, which are the "sticks" of the "stick figure," the armature can be manipulated into a desired pose. As the armature is posed by the animator, the animation tools modify character model so that the bodily attitude of the character roughly mirrors that of the armature.

Animation variables are another way of defining the character animation of a complex character model. Animation variables are parameters for functions that modify the appearance of a character model. In their simplest form, animation variables may manipulate armature segments, thereby altering the appearance of the character model indirectly, or manipulate the character model directly, bypassing the armature.

Animation variables can be used to abstract complicated modifications to a character model to a relatively simple control. For example, a single animation variable can define the degree of opening of a character's mouth. In this example, the value of the animation variable may manipulate several different parts of the armature and/or modify portions of the character model directly to create a modified character model having a mouth opened to the desired degree. For each animation variable, there are often one or more functions that specify how the value of the animation variable affects the character model. The set of functions defining the relationship between animation variables and a character model is sometimes referred to as the rigging of the character model.

The values of various foot roll parameters, such as heel roll and ball roll, can be specified as animation variables. In an embodiment of the invention, the rigging of the character model includes functions that automatically reposition the feet of the character model in response to the values of foot roll parameters, so as to keep the foot contact points in a fixed position with respect to a ground plane.

Figure 2:
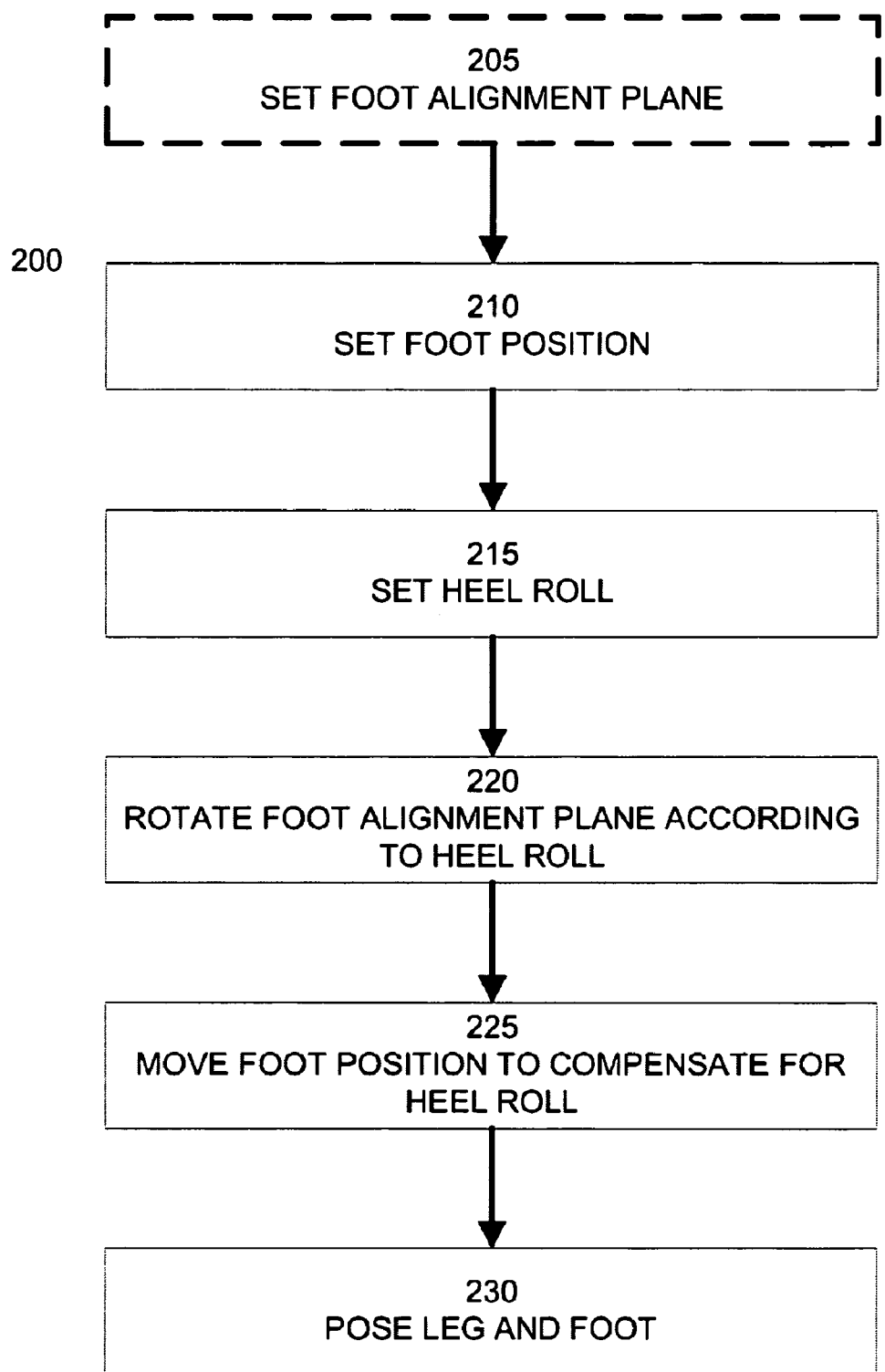
FIG. 2 illustrates a method of repositioning the foot of a character model to compensate for heel roll according to an embodiment of the invention.

FIG. 2 illustrates a method 200 of repositioning the foot of a character model to compensate for heel roll according to an embodiment of the invention. At optional step 205, an alignment plane is specified for one or more feet of the character model. In an embodiment, an animator uses an animation software tool to manually specify the orientation of the alignment plane. A horizontal alignment plane can be used to represent level ground. In an embodiment, this can be set as the default orientation of the alignment plane absent an animator specifying a different orientation. Sloping ground, such as hills, can be represented by changing the orientation of the alignment plane to a non-horizontal orientation. In an embodiment, the animation software tool assumes that the foot of the character model has been placed in contact with the ground based on the foot position specified by the animator; thus the alignment plane is automatically positioned so as to pass through a specific point of the foot model. This point, referred to as a heel contact point, can be defined as part of the foot model prior to the foot model's use in the animation software tool. In additional embodiments, the location of the heel contact point can be adjusted to meet the artistic demands of a particular scene. In another embodiment, the alignment plane can be automatically determined from the position and orientation of surfaces in the scene that are in close proximity to the foot of the character model. In this latter embodiment, step 205 may be performed after step 210, which is described below.

The position of the foot of a character model is specified in step 210. In an embodiment, an animator enters the value of one or more animation variables into an animation software tool to specify the position of the foot of the character model. In a further embodiment, the animator specifies the position of the foot of the character model by specifying the position and orientation of the parts of the associated leg of the character model, such as the thigh and calf portions of the character model's leg. In an alternate embodiment, the animator can specify the location of the foot of the character model directly, for example by specifying the position of a specific point of the foot model, for example the ankle joint, and orientation of the foot model around this joint. The animation system then determines the appropriate position and orientation of the associated leg of the character model using techniques such as inverse kinematics.

Figure 3A:
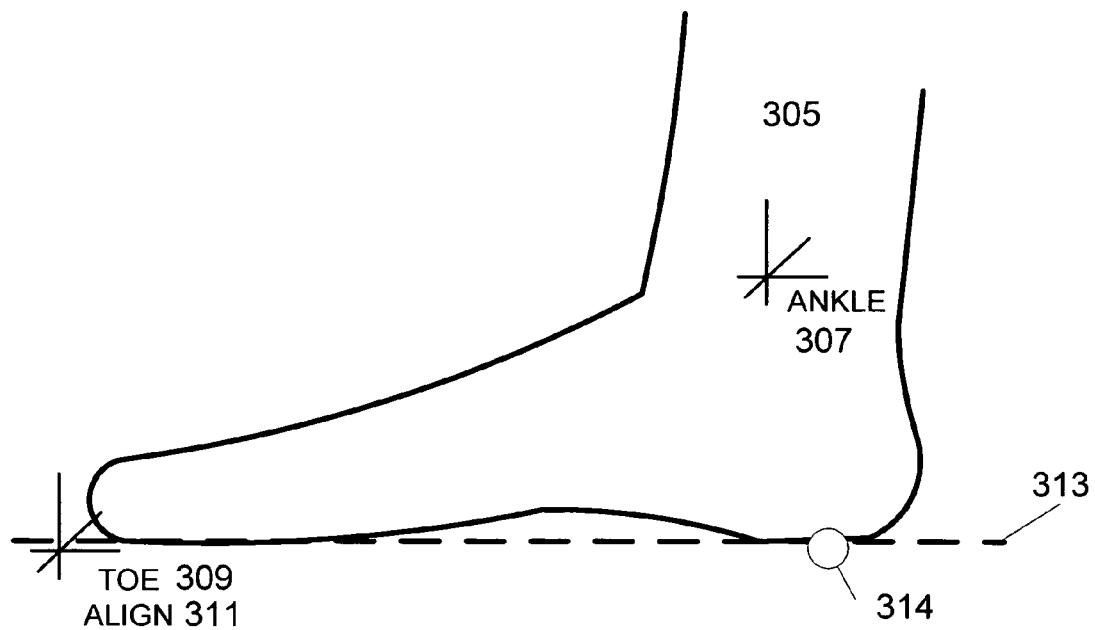
FIGS. 3A-3E illustrate an example application of the method of FIG. 2 according to an embodiment of the invention.

In an example application of step 210, FIG. 3A illustrates the position of a foot model 305. In an embodiment, the position of the foot model is specified by the position of ankle joint 307. In addition to the ankle joint, two additional coordinate spaces are associated with the foot model 305: toe space coordinate system 309 and align space coordinate system 311. In FIG. 3A, the toe space 309 and align space 311 are aligned to the same position and orientation. The align space 311 represents the position and orientation of alignment plane 313, specified for example in step 205. It should be noted that the heel of the foot model 305 contacts the alignment plane 313 at heel contact point 314. The toe space 309 represents the position of the toe of the foot model relative to the ankle joint 307.

Returning the method 200, the amount of heel roll is specified in step 215. In an embodiment, an animator specifies the heel roll as an animation variable associated with a foot of the character model using an animation tool. In response to the heel roll specified in step 215, step 220 rotates the align space defining the orientation of the alignment plane by the amount of heel roll specified in step 215. In an embodiment, this rotation is expressed as a transformation matrix that rotates the align space around a heel contact point.

Figure 3B:
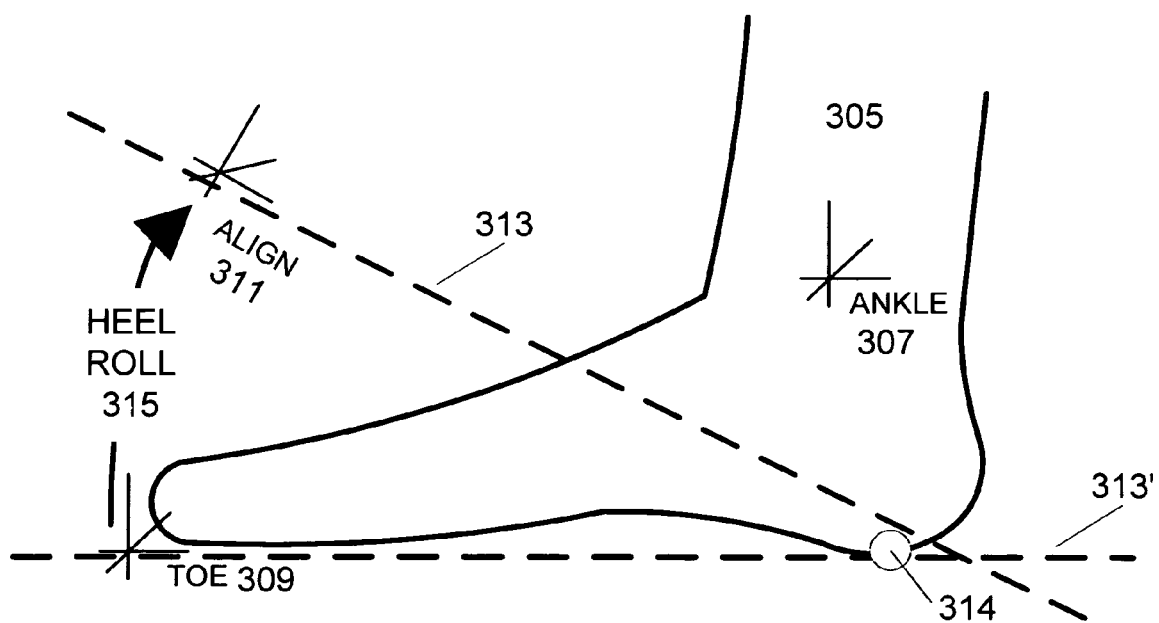

FIG. 3B illustrates an example application of steps 215 and 220. A heel roll amount 315 is specified for the foot model 305. The align space 311 is rotated about the heel contact point 314 by the heel roll amount 315. This in turn rotates the orientation of the alignment plane 313 to the position shown. For the purposes of illustration, the plane 313' shows the original unrotated position of the alignment plane along with contact point 314.

Method 200 continues with step 225, in which the foot position is changed to compensate for the heel roll. In an embodiment, the foot position, as specified for example by the position of the ankle joint, is moved to a new position by applying the same transformation that was applied to move the align space. For example, this can be accomplished by applying the same transformation matrix to the position of the foot that was previously used to rotate the align space by the heel roll amount. In an embodiment, this transformation moves the foot position by rotating the ankle joint, or other reference point of the foot model, around the heel contact point.

Figure 3C:
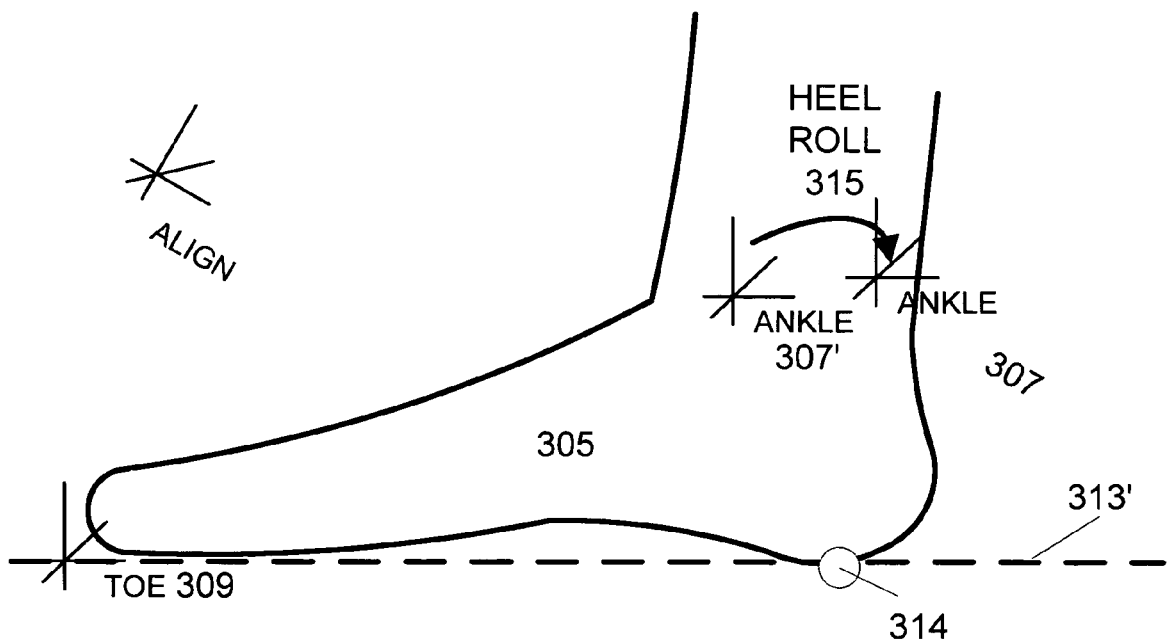

FIG. 3C illustrates an example application of step 225. In this example, the ankle joint 307 of foot model 305 is moved to a new position based upon the heel roll transformation 315. For the purposes of illustration, the ankle joint 307' shows the original position of the ankle joint prior to the application of the transformation.

Step 230 poses the leg and foot model according to the new position and orientations specified by method 200. In an embodiment, the foot model is rotated to align with the rotated alignment plane specified in step 220. Additionally, the position of the foot model is changed to that specified in step 225. For example, the foot model can be moved so that its ankle joint aligns with the ankle joint position specified in step 225. In further embodiments, additional unrelated animation variables specifying other aspects of the foot model can be applied at this point as well. Additionally, an embodiment can determine the pose of the leg associated with the foot model using other animation variables and/or other techniques such as inverse kinematics.

Figure 3D:
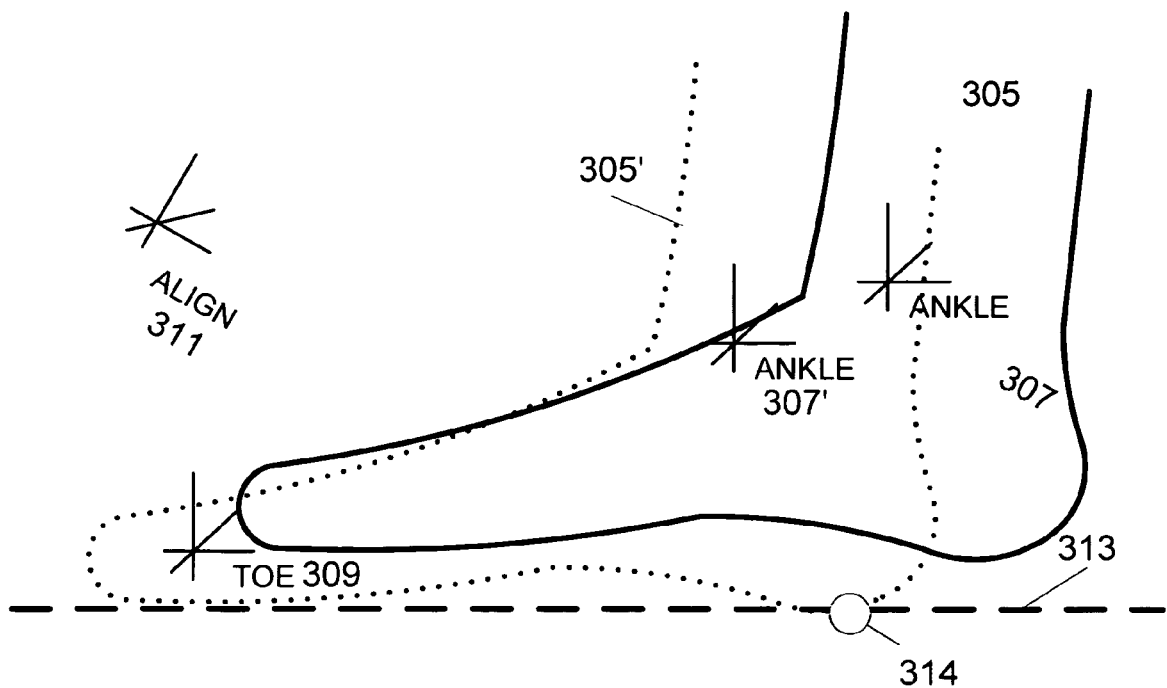
Figure 3E:
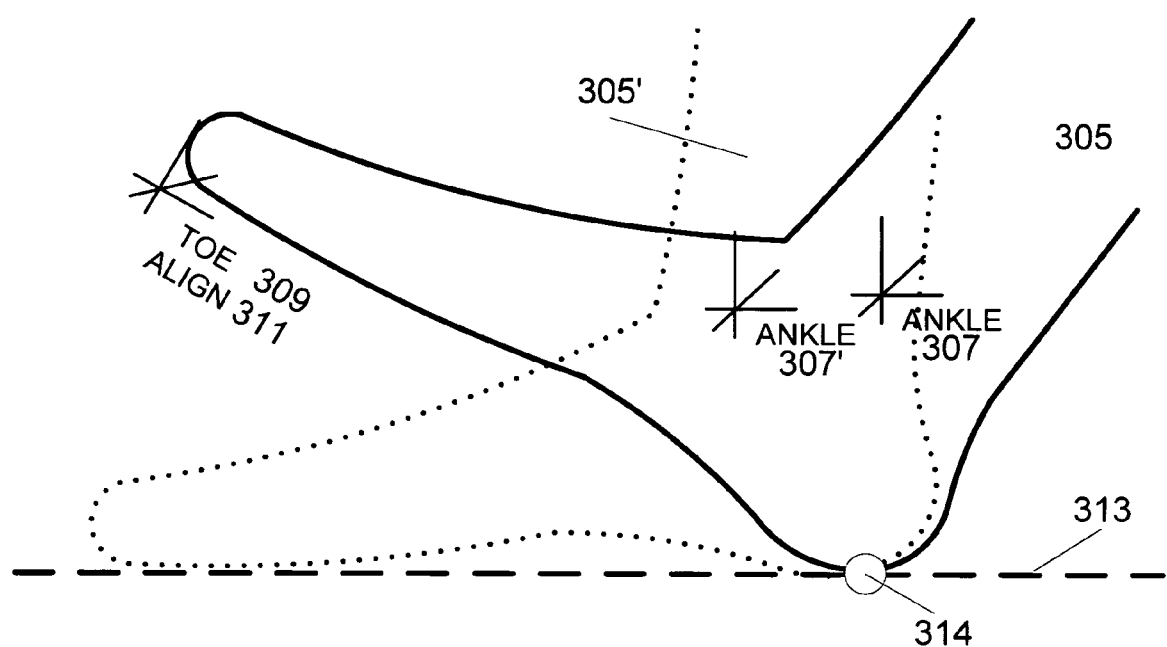

FIGS. 3D and 3E illustrate an example application of step 225. In FIG. 3D, the foot model 305 is shifted from its original position to the position specified by the newly moved ankle joint 307. For the purposes of illustration, an outline 305' shows the original position of the foot model 305 as specified by the ankle joint 307'. As can be seen in FIG. 3D, the repositioning of the foot model 305 causes the heel contact point 314 to break contact with the alignment plane 313; however, contact will be restored when the foot model is rotated to align with the rotated align space 311.

FIG. 3E illustrates the rotation of the foot model 305 to the orientation specified by the heel roll. In this example, this is accomplished by rotating the foot model 305 around the heel contact point 314 to align the toe space 309 with the rotated align space 311. As can be seen in FIG. 3E, this rotation also has the effect of placing the heel contact point 314 of the foot model back in contact with alignment plane 313.

Figure 4:
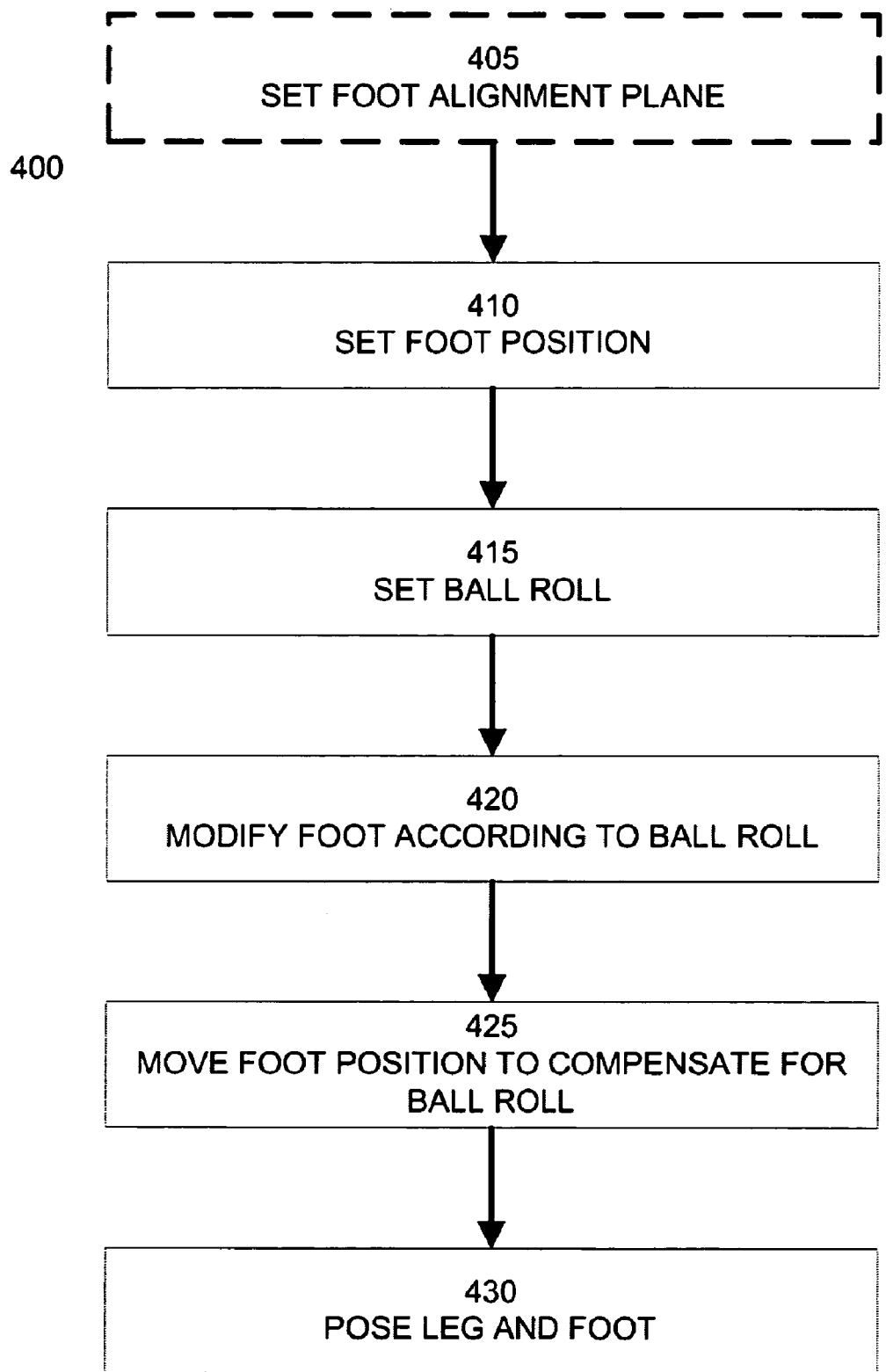
FIG. 4 illustrates a method of repositioning the foot of a character model to compensate for ball roll according to an embodiment of the invention.

Similar to method 200, FIG. 4 illustrates a method 400 of repositioning the foot of a character model to compensate for ball roll according to an embodiment of the invention. At optional step 405, an alignment plane is specified for one or more feet of the character model. In an embodiment, an animator uses an animation software tool to manually specify the orientation of the alignment plane to represent level or sloping ground. In an embodiment, the animation software tool assumes that the foot of the character model has been placed in contact with the ground based on the foot position specified by the animator; thus the alignment plane is automatically positioned so as to pass through a specific point of the foot model. This point, referred to as a ball contact point, can be defined as part of the foot model prior to the foot model's use in the animation software tool. In additional embodiments, the location of the ball contact point can be adjusted to meet the artistic demands of a particular scene. In another embodiment, the alignment plane can be automatically determined from the position and orientation of surfaces in the scene that are in close proximity to the foot of the character model. In this latter embodiment, step 405 may be performed after step 410, which is described below.

The position of the foot of a character model is specified in step 410. In an embodiment, an animator enters the value of one or more animation variables into an animation software tool to specify the position of the foot of the character model. In a further embodiment, the animator specifies the position of the foot of the character model by specifying the position and orientation of the parts of the associated leg of the character model, such as the thigh and calf portions of the character model's leg. In an alternate embodiment, the animator can specify the location of the foot of the character model directly, for example by specifying the position of a specific point of the foot model, for example the ankle joint, and orientation of the foot model around this joint. The animation system then determines the appropriate position and orientation of the associated leg of the character model using techniques such as inverse kinematics.

Figure 5A:
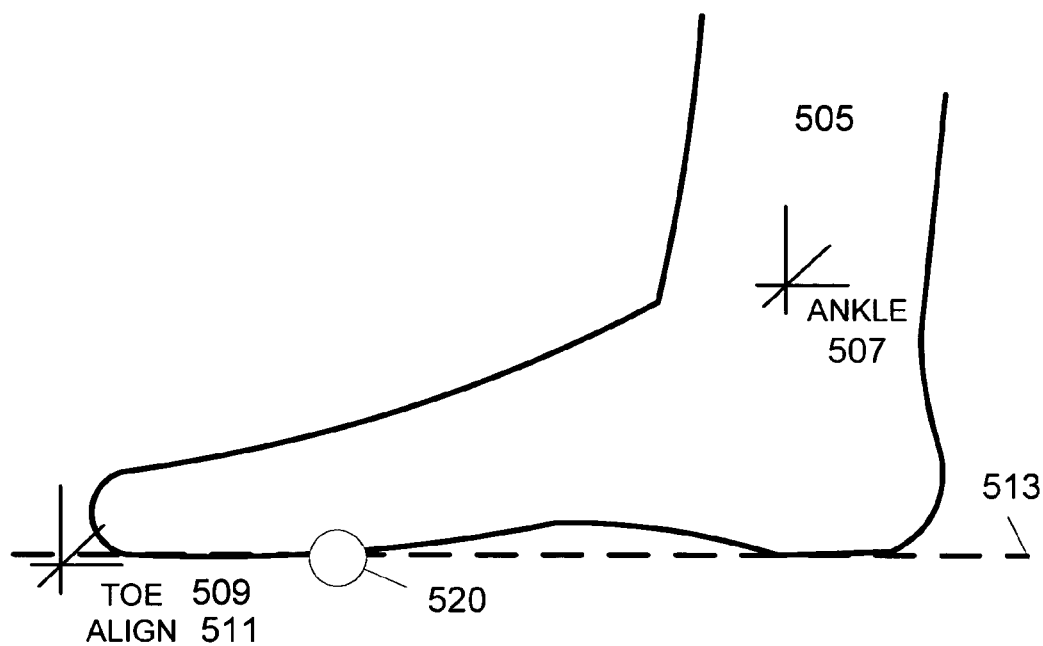
FIGS. 5A-5E illustrate an example application of the method of FIG. 4 according to an embodiment of the invention.

In an example application of step 410, FIG. 5A illustrates the position of a foot model 505. In an embodiment, the position of the foot model is specified by the position of ankle joint 507. In addition to the ankle joint, two additional coordinate spaces are associated with the foot model 505: toe space coordinate system 509 and align space coordinate system 511. In FIG. 5A, the toe space 509 and align space 511 are aligned to the same position and orientation. The align space 511 represents the position and orientation of alignment plane 513, specified for example in step 505. It should be noted that the ball of the foot model 505 contacts the alignment plane 513 at ball contact point 520. The toe space 509 represents the position of the toe of the foot model relative to the ankle joint 507.

Returning the method 400, the amount of ball roll is specified in step 415. In an embodiment, an animator specifies the ball roll as an animation variable associated with a foot of the character model using an animation tool. In response to the ball roll specified in step 415, step 420 modifies the foot model to reflect the specified amount of ball roll. In an embodiment, step 420 rotates the toe space of the foot model around a ball contact point by the amount of ball roll specified in step 415. In an embodiment, this rotation is expressed as a transformation matrix. In an additional embodiment, the toe portion of the foot model is deformed to reflect the bending of the foot model around the foot ball joint. This deformation can be accomplished by rotating one or more control points defining the shape of the toe portion of the foot model by all or a portion of the amount of ball rotation specified in step 415. Alternatively, this deformation can be accomplished by any other technique known in the art for modifying character models in response to animation variables specifying joint rotations, control points, or other attributes of a model.

Figure 5B:
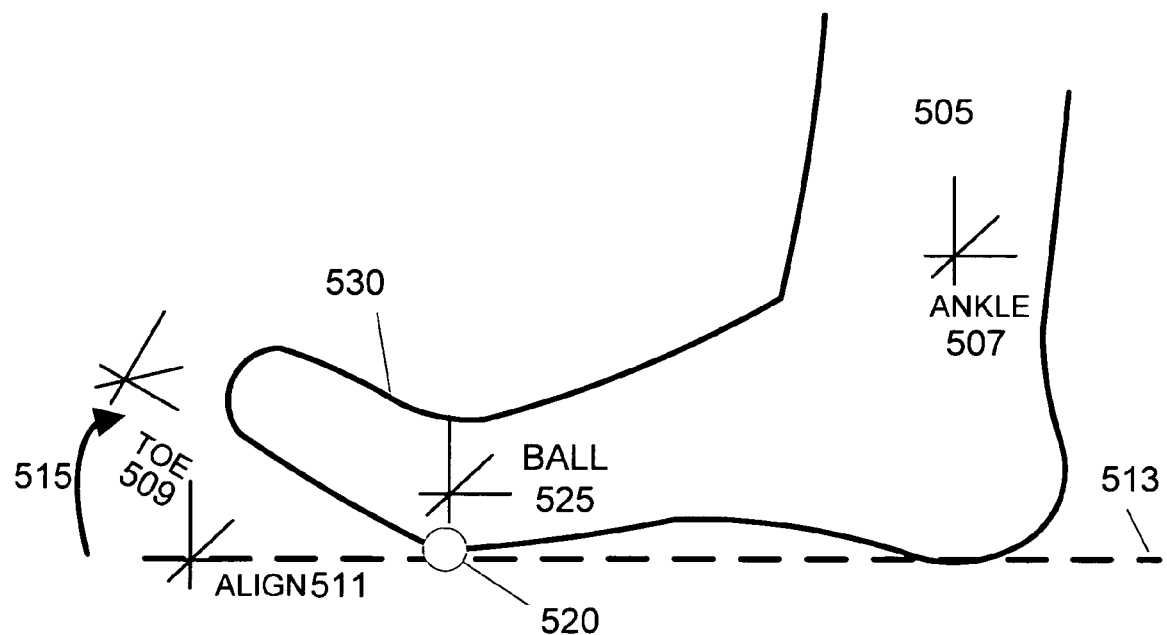

FIG. 5B illustrates an example application of steps 415 and 420. A ball roll amount 515 is specified for the foot model 505. The toe space 509 is rotated about the ball contact point 520 by the ball roll amount 515. Additionally, the toe portion 530 of the foot model 505 is deformed to reflect the bending of the foot model around the ball joint 525.

Method 400 continues with step 425, in which the foot position is changed to compensate for the ball roll. In an embodiment, the foot position, as specified for example by the position of the ankle joint, is moved to a new position by applying the inverse of the transformation that was applied to move the toe space. For example, this can be accomplished by inverting the transformation matrix applied to the toe space and then applying the inverted transformation to the position of the foot.

Figure 5C:
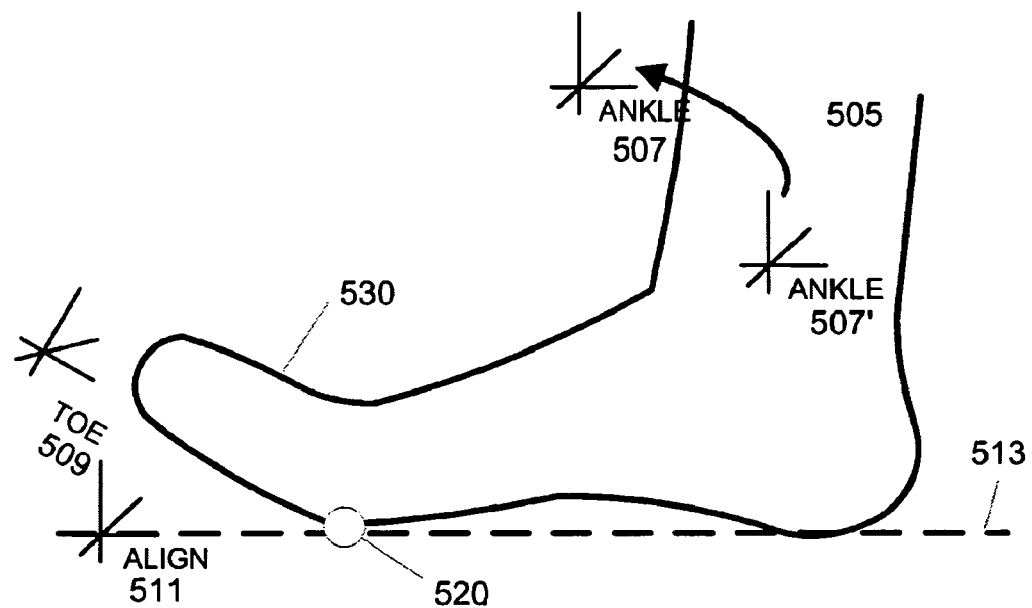

FIG. 5C illustrates an example application of step 425. In this example, the ankle joint 507 of foot model 505 is moved to a new position based upon the inverse 535 of the ball roll transformation 515. For the purposes of illustration, the ankle joint 507' shows the original position of the ankle joint prior to the application of the inverse transformation 535.

Step 430 poses the leg and foot model according to the new position and orientations specified by method 400. In an embodiment, the foot model is rotated to align with the alignment plane specified in step 405. Additionally, the position of the foot model is changed to that specified in step 425. For example, the foot model can be moved so that its ankle joint aligns with the ankle joint position specified in step 425. In further embodiments, additional unrelated animation variables specifying other aspects of the foot model can be applied at this point as well. Additionally, an embodiment can determine the pose of the leg associated with the foot model using other animation variables and/or other techniques such as inverse kinematics.

Figure 5D:
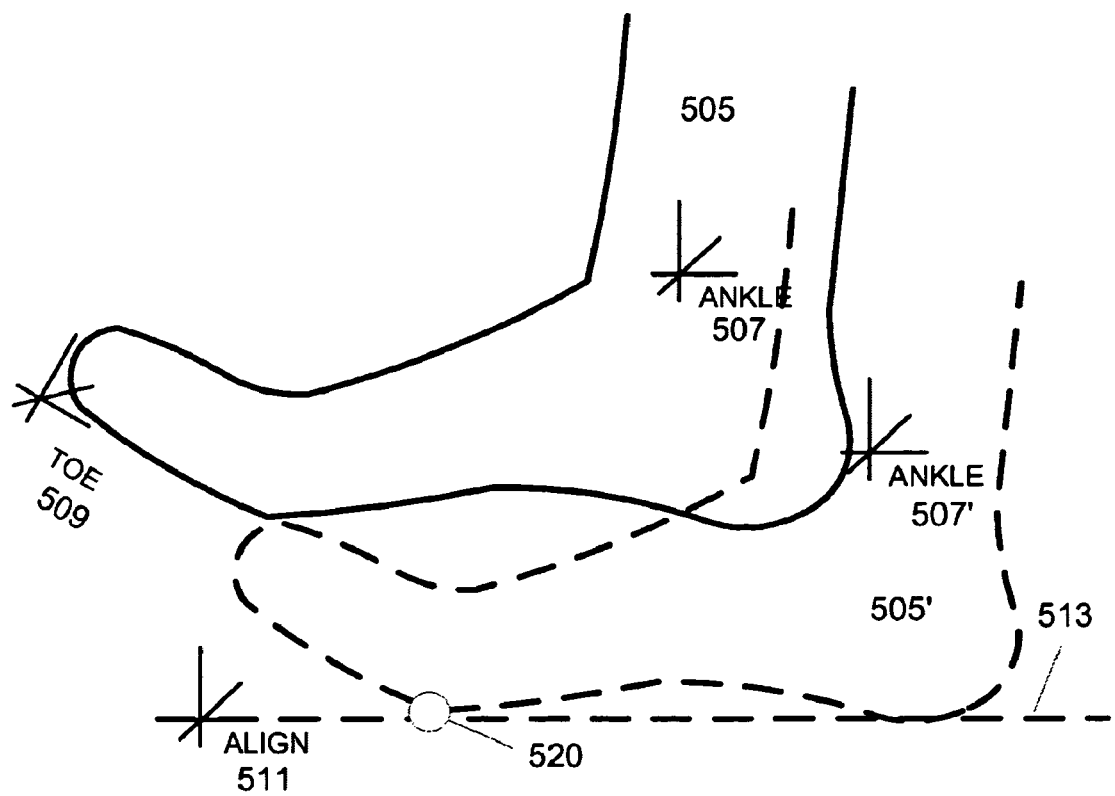
Figure 5E:
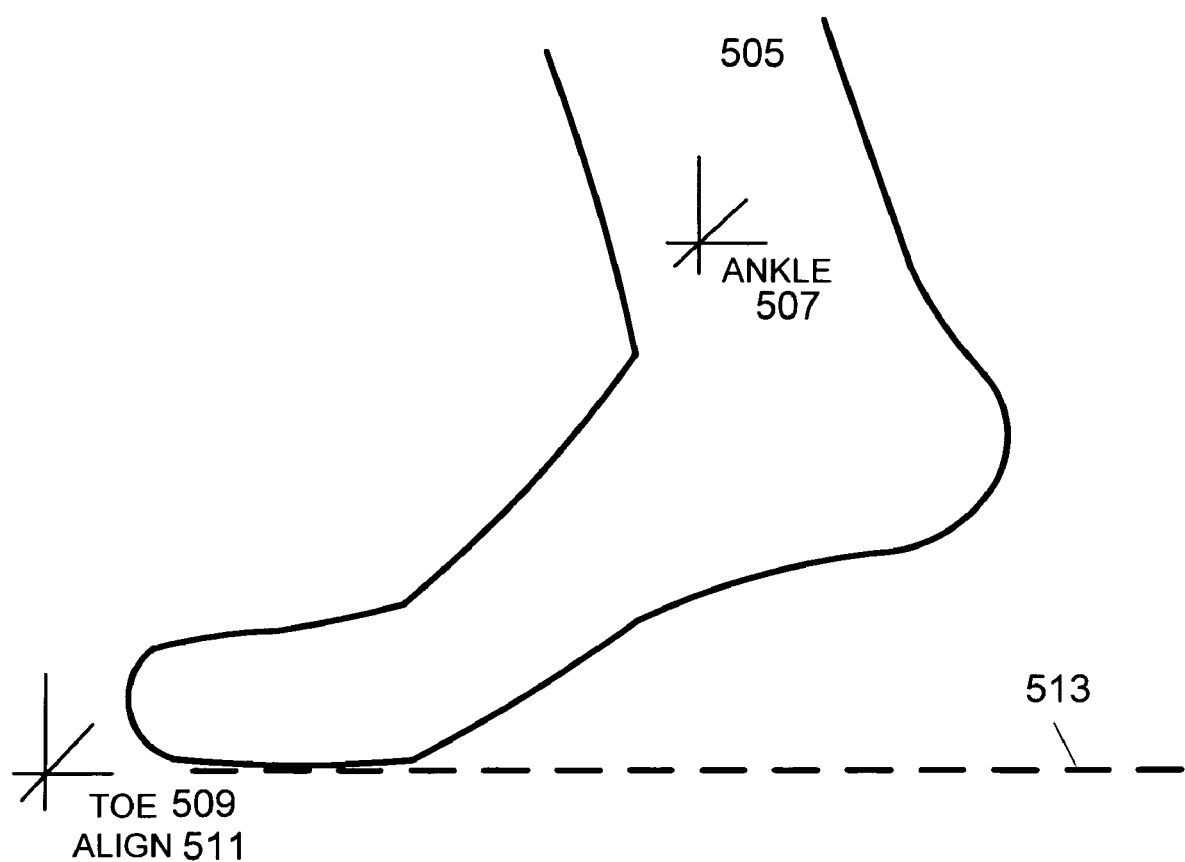

FIGS. 5D and 5E illustrate an example application of step 425. In FIG. 5D, the foot model 505 is shifted from its original position to the position specified by the newly moved ankle joint 507. For the purposes of illustration, an outline 505' shows the original position of the foot model 505 as specified by the ankle joint 507'. As can be seen in FIG. 5D, the repositioning of the foot model 505 causes the ball of the foot model to break contact with contact point 520; however, contact will be restored when the foot model is rotated to align with the alignment plane 513.

FIG. 5E illustrates the rotation of the foot model 505 to the orientation specified by the ball roll. In this example, this is accomplished by rotating the foot model 505 around the ball contact point 520 to align the toe space 509 with the align space 511. As can be seen in FIG. 5E, this rotation also has the effect of placing the ball contact point 520 in contact with the alignment plane 513.

Although the foot roll rotation has been discussed with reference to examples of heel roll and ball roll, additional embodiments of the invention can implement additional foot rotations. For example, a toe roll rotation, defined as the rotation of the foot around a toe contact point at the toe of a foot model, can be implemented using a similar method to that described for heel roll, with the main difference being rotating the alignment plane in the opposite direction. Additionally, although the above discussion has assumed that an animator specifies the foot position and foot roll, in further embodiments, these parameters can be specified automatically by a software application, for example using a simulation or referencing a predetermined animation cycle.

Figure 6:
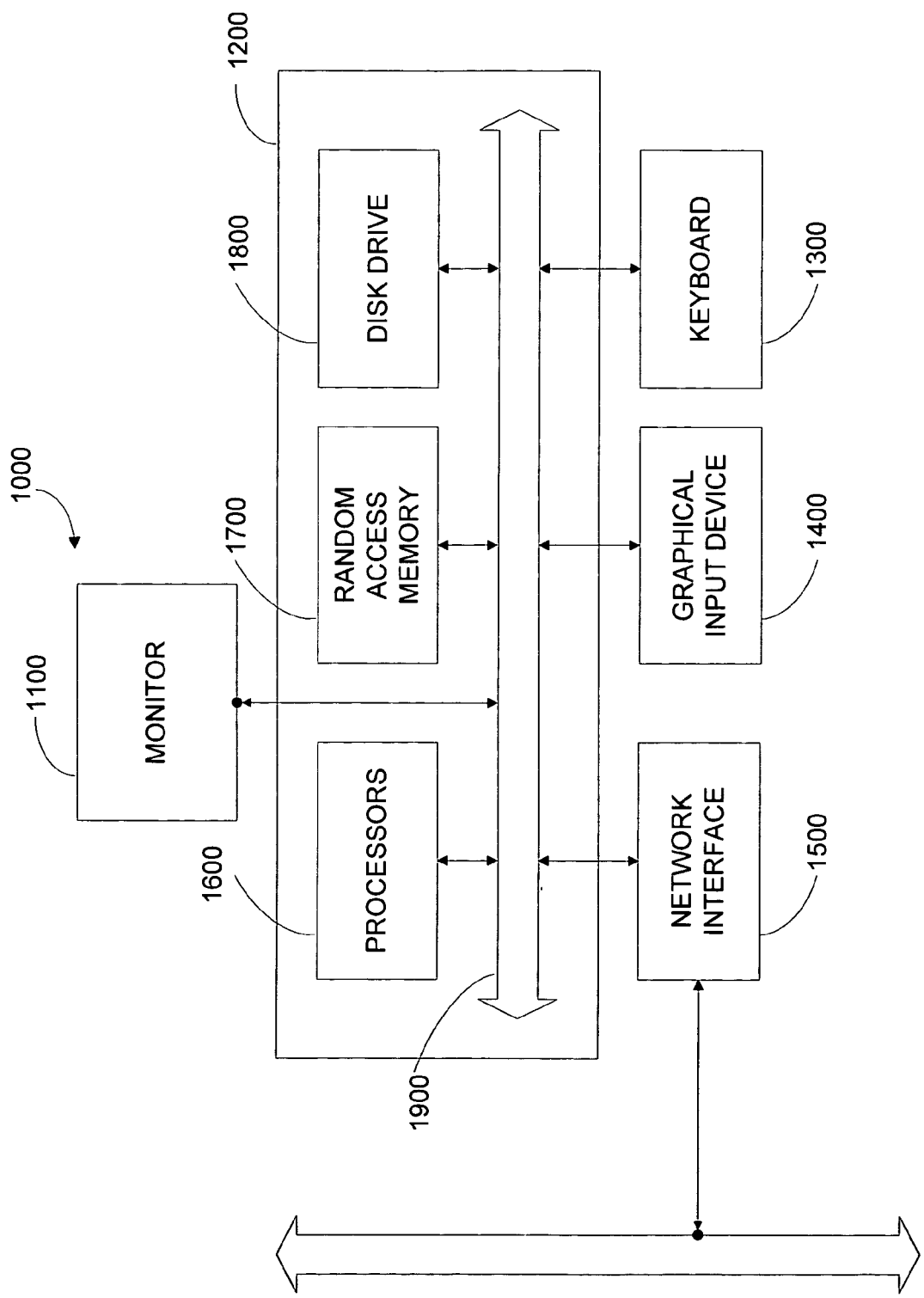
FIG. 6 illustrates an example computer system suitable for implementing an embodiment of the invention.

FIG. 6 illustrates an example computer system suitable for implementing an embodiment of the invention. FIG. 6 illustrates an example computer system 1000 capable of implementing an embodiment of the invention. Computer system 1000 typically includes a monitor 1100, computer 1200, a keyboard 1300, a user input device 1400, and a network interface 1500. User input device 1400 includes a computer mouse, a trackball, a track pad, graphics tablet, touch screen, and/or other wired or wireless input devices that allow a user to create or select graphics, objects, icons, and/or text appearing on the monitor 1100. Embodiments of network interface 1500 typically provides wired or wireless communication with an electronic communications network, such as a local area network, a wide area network, for example the Internet, and/or virtual networks, for example a virtual private network (VPN).

Computer 1200 typically includes components such as one or more general purpose processors 1600, and memory storage devices, such as a random access memory (RAM) 1700, disk drives 1800, and system bus 1900 interconnecting the above components. RAM 1700 and disk drive 1800 are examples of tangible media for storage of data, audio/video files, computer programs, applet interpreters or compilers, virtual machines, embodiments of the herein described invention including geometric scene data, object data files, shader descriptors, a rendering engine, output image files, texture maps, and displacement maps. Further embodiments of computer 1200 can include specialized audio and video subsystems for processing and outputting audio and graphics data. Other types of tangible media include floppy disks; removable hard disks; optical storage media such as DVD-ROM, CD-ROM; non-volatile memory devices such as flash memories; read-only-memories (ROMS); battery-backed volatile memories; and networked storage devices.

It should be noted that once the posed or deformed model has been created using one or more of the above discussed embodiments, any rendering technique, for example ray-tracing or scanline rendering, can create a final image or frame from the model in combination with lighting, shading, texture mapping, and any other image processing information.

Further embodiments can be envisioned to one of ordinary skill in the art after reading the attached documents. In other embodiments, combinations or sub-combinations of the above disclosed invention can be advantageously made. The block diagrams of the architecture and flow charts are grouped for ease of understanding. However it should be understood that combinations of blocks, additions of new blocks, re-arrangement of blocks, and the like are contemplated in alternative embodiments of the present invention.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-readable storage medium including instructions adapted to direct a computer to perform an operation, the operation comprising:
    receiving a first foot position of a foot model;
    defining a contact point on the foot model based on the first foot position, wherein the contact point intersects a ground plane at a first point on the ground plane;
    receiving a foot roll parameter for the foot model, wherein the foot roll parameter specifies a desired foot roll angle between the ground plane and at least a portion of the foot model;
    defining a foot model transformation adapted to change a relative angle between at least the portion of the foot model and the ground plane to the desired foot roll angle;
    moving the foot model to a second foot position using a first application of the first foot model transformation to the foot model; and
    rotating at least the portion of the foot model at the second foot position using a second application of the first foot model transformation to at least the portion of the foot model, whereby the contact point on the rotated foot model at the second position intersects the ground plane at the first point on the ground plane.

2. The computer-readable storage medium of claim 1, wherein moving the foot model to a second position using the first application of the first foot model transformation to the foot model comprises:
    defining a transformation origin at the contact point; and
    rotating the first foot position around the transformation origin using the first foot model transformation to define the second foot position.

3. The computer-readable storage medium of claim 1, wherein the contact point on the foot model at the second foot position does not intersect the ground plane at the first point on the ground plane.

4. The computer-readable storage medium of claim 1, wherein defining the contact point on the foot model comprises:
    receiving a default ground plane orientation from an animation software application.

5. The computer-readable storage medium of claim 1, defining the contact point on the foot model comprises:
    receiving an animation variable value defining a ground plane orientation.

6. The computer-readable storage medium of claim 1, comprising:
    defining an alignment plane passing through the contact point at the first foot position and aligned with the foot model; and
    rotating the alignment plane around the contact point based on the foot model transformation.

7. The computer-readable storage medium of claim 6, wherein rotating at least the portion of the foot model at the second foot position comprises:
    rotating at least the portion of the foot model at the second foot position to realign with the rotated alignment plane.

8. The computer-readable storage medium of claim 1, wherein receiving the foot roll parameter comprises:
    receiving an animation variable value adapted to specify the desired foot roll angle between the ground plane and the foot model.

9. The computer-readable storage medium of claim 1, wherein the foot roll parameter includes a heel roll parameter.

10. The computer-readable storage medium of claim 1, wherein the foot roll parameter includes a toe roll parameter.

11. A computer-readable storage medium including instructions adapted to direct a computer to perform an operation, the operation comprising:
    receiving a first foot position of a foot model;
    defining a contact point on the foot model based on the first foot position, wherein the contact point intersects a ground plane at a first point on the ground plane;
    receiving a foot roll parameter for the foot model, wherein the foot roll parameter specifies a desired foot roll angle between the ground plane and at least a portion of the foot model;
    defining a foot model transformation adapted to change a relative angle between at least the portion of the foot model and the ground plane to the desired foot roll angle;
    moving the foot model to a second foot position using an application of an inverse first foot model transformation to the foot model; and
    rotating at least the portion of the foot model at the second foot position using an application of the first foot model transformation to at least the portion of the foot model, whereby the contact point on the rotated foot model at the second position intersects the ground plane at the first point on the ground plane.

12. The computer-readable storage medium of claim 11, wherein moving the foot model to a second position using the application of the inverse of the first foot model transformation to the foot model comprises:
    defining a transformation origin at the contact point; and
    rotating the first foot position around the transformation origin using the inverse of first foot model transformation to define the second foot position.

13. The computer-readable storage medium of claim 11, wherein the contact point on the foot model at the second foot position does not intersect the ground plane at the first point on the ground plane.

14. The computer-readable storage medium of claim 11, wherein defining the contact point on the foot model comprises:
    receiving a default ground plane orientation from an animation software application.

15. The computer-readable storage medium of claim 11, defining the contact point on the foot model comprises:
    receiving an animation variable value defining a ground plane orientation.

16. The computer-readable storage medium of claim 11, comprising:
    defining an alignment plane passing through the contact point at the first foot position and aligned with the foot model; and
    rotating the foot model relative to the alignment plane around the contact point based on the foot model transformation.

17. The computer-readable storage medium of claim 16, wherein rotating at least the portion of the foot model at the second foot position comprises:
    rotating at least the portion of the foot model at the second foot position to realign with the rotated alignment plane.

18. The computer-readable storage medium of claim 11, wherein receiving the foot roll parameter comprises:
    receiving an animation variable value adapted to specify the desired foot roll angle between the ground plane and at least a portion of the foot model.

19. The computer-readable storage medium of claim 11, wherein the foot roll parameter includes a ball roll parameter.

20. The computer-readable storage medium of claim 11, wherein the foot model transformation is defined as a transformation matrix and the inverse of the foot model transformation is defined as the inverse of the transformation matrix.

* * * * *